(12) United States Patent
Haase

(10) Patent No.: US 10,699,891 B2
(45) Date of Patent: Jun. 30, 2020

(54) MASS SPECTROMETER WITH A LASER DESORPTION ION SOURCE, AND LASER SYSTEM WITH A LONG SERVICE LIFE

(71) Applicant: Bruker Daltonik GmbH, Bremen (DE)

(72) Inventor: Andreas Haase, Bremen (DE)

( * ) Notice: Subject to any disclaimer, the term of this patent is extended or adjusted under 35 U.S.C. 154(b) by 59 days.

(21) Appl. No.: 16/061,283

(22) PCT Filed: Dec. 22, 2015

(86) PCT No.: PCT/EP2015/080926
§ 371 (c)(1),
(2) Date: Jun. 11, 2018

(87) PCT Pub. No.: WO2017/108091
PCT Pub. Date: Jun. 29, 2017

(65) Prior Publication Data
US 2018/0366311 A1    Dec. 20, 2018

(51) Int. Cl.
*H01J 49/00* (2006.01)
*H01J 49/16* (2006.01)
*G02F 1/35* (2006.01)
*H01J 49/04* (2006.01)
*H01J 49/40* (2006.01)

(52) U.S. Cl.
CPC .......... *H01J 49/164* (2013.01); *G02F 1/3501* (2013.01); *H01J 49/0418* (2013.01); *H01J 49/403* (2013.01)

(58) Field of Classification Search
CPC ........ H01J 49/00; H01J 49/02; H01J 49/0059; H01J 49/0418; H01J 49/16; H01J 49/161; H01J 49/162; H01J 49/164

USPC ........................................ 250/281, 282, 288
See application file for complete search history.

(56) References Cited

U.S. PATENT DOCUMENTS

| | | | |
|---|---|---|---|
| 7,235,781 B2 | 6/2007 | Haase et al. | |
| 7,460,569 B2 | 12/2008 | Van Saarloos | |
| 8,872,102 B2 | 10/2014 | Clemmer et al. | |
| 8,885,246 B2 | 11/2014 | Horain et al. | |
| 2012/0185115 A1* | 7/2012 | Dean | F41H 7/005 701/2 |

(Continued)

FOREIGN PATENT DOCUMENTS

| | | |
|---|---|---|
| DE | 102011112649 A1 | 3/2013 |
| JP | 2001350166 A | 12/2001 |

*Primary Examiner* — Jason L McCormack
(74) *Attorney, Agent, or Firm* — Benoit & Côté Inc.

(57) ABSTRACT

The invention relates to a mass spectrometer with laser-desorption ion source, particularly for MALDI. A laser system with optical laser spot control is proposed in which the laser spot shift brought about by means of a temporally variable angular deflection at a mirror system is performed on the laser beam before or during the energy multiplication. The laser beam, which is deflected through a small angle by the mirror system, is converted by a suitable flat-field optical system into a parallel-shifted laser beam, which then passes through a multiplier crystal. After exiting the multiplier crystal system, the parallel-shifted beam is converted back into a slightly angled beam by a flat-field optical system, this latter beam then bringing about the spot shift on the sample. The multiplier crystal is conserved by the continuously temporally changed parallel shift of the laser beam in the multiplier crystal, thus prolonging its service life.

15 Claims, 2 Drawing Sheets

(56) References Cited

U.S. PATENT DOCUMENTS

2013/0056628 A1\* 3/2013 Holle ................. H01J 49/0004
          250/282
2013/0099112 A1\* 4/2013 Haase ................. H01J 49/164
          250/282
2015/0122986 A1 5/2015 Haase \* cited by examiner

MASS SPECTROMETER WITH A LASER DESORPTION ION SOURCE, AND LASER SYSTEM WITH A LONG SERVICE LIFE

The invention relates to a mass spectrometer with laser desorption ion source, which ionizes the analyte molecules of a sample by means of laser desorption from a sample support, in particular by means of matrix-assisted laser desorption. The associated laser system has an extended service life.

PRIOR ART

Over the past twenty years, two types of ionization have become established in the mass spectrometry of biological macromolecules: ionization by matrix-assisted laser desorption (MALDI), and electrospray ionization (ESI). The biological macromolecules to be analyzed are termed analyte molecules below. In the MALDI method, the analyte molecules are generally prepared on the surface of a sample support, in a solid, polycrystalline matrix layer, and are predominantly singly ionized, whereas in the ESI method they are dissolved in a liquid and multiply ionized. It was these two methods which first made possible the mass-spectrometric analysis of biological macromolecules for investigations in genomics, proteomics and metabolomics; their inventors, John B. Fenn and Koichi Tanaka, were awarded the Nobel Prize in Chemistry in 2002.

Matrix-assisted laser desorption and ionization has been sustainably improved in recent years by switching from nitrogen lasers to solid state UV lasers with a longer service life, and in particular by using beam generation with a spatially modulated beam profile for an increased ion yield. The method of beam generation and the corresponding laser systems have been described in the equivalent documents DE 10 2004 044 196 A1, GB 2 421 352 B and U.S. Pat. No. 7,235,781 B2 (A. Haase et al., 2004) and are known by the commercial name "smartbeam".

The "smartbeam" is based on the finding that the ionization rate of the sample material increases greatly when the laser spots are made very small, down to a few micrometers. Only relatively few ions are formed in these small laser spots, however, and it is therefore expedient to generate several spots simultaneously, i.e. to use a pattern of laser spots.

In time-of-flight mass spectrometers with ionization of the samples by matrix-assisted laser desorption (MALDI), the laser beam is usually focused, by means of lenses and mirrors in fixed adjustment, onto a sample on a sample support such that the laser spot with the desired diameter and energy density (or a pattern of such laser spots) impinges in the ion source at a location on the sample support which is optimally specified for high sensitivity. The samples on the sample support contain a thin layer of tiny crystals of the matrix substance, in each of which a small quantity of analyte molecules is embedded. The samples are each moved into the focus of the laser spot by a mechanical movement of the sample support. A light pulse from the laser, usually a pulsed UV laser, produces a plasma cloud of the sample material, in which ions of the matrix and analyte molecules are produced.

Modern embodiments of MALDI lasers (see DE 10 2004 044 196 A1; A. Haase et al., 2004, corresponding to GB 2 421 352 B; U.S. Pat. No. 7,235,781 B2) produce not just a single irradiation spot, but a pattern of several irradiation spots simultaneously, whereby spot diameter and energy density can be optimized in such a way that the achieved yield of analyte ions can be ten to one hundred times higher. The pattern can contain 4, 9 or 16 irradiation spots in a square arrangement, for example, but also 7 or 19 spots in a hexagonal arrangement. The more economic use of the sample material allows the utilization factor of the samples to be increased.

The publication DE 10 2013 018469 A1 (A. Haase; corresponding to GB 2 521 730 A and U.S. Pat. No. 9,741,550 B2) elucidates a very simple and low-cost method to generate spot patterns with five or nine spots in a square arrangement.

The generation of patterns increases the ion yield per analyte molecule by far more than a factor of 10 and reduces the sample consumption accordingly; this is important especially for imaging mass spectrometry on thin tissue sections. Since modern mass spectrometers are designed for a spectral acquisition repetition rate of 10,000 spectra per second and more, the energy efficiency of the generation of the spot pattern is very important if the aim is to avoid the need for expensive high-performance lasers.

The patent specification DE 10 2011 112 649 B4 (A. Haase et al.; see also U.S. Pat. No. 8,872,102 B2 and GB 2 495 805 A) presents a laser system for MALDI applications which allows an optical movement of the laser spot (or laser spot pattern) on the sample and thus facilitates faster, lower-inertia scanning of a sample than can be achieved with a movement of the mechanically slow sample support plate. The temporally variable spot control is based on two small, low-inertia galvanometer mirrors, which deflect the UV beam to a position where the diameter of the UV beam is of the order of millimeters. The beam here is deflected through tiny angles in two spatial directions; the deflection is then translated into a movement of the tiny laser spot or laser spot pattern in a square area with an edge length of a few 100 micrometers by means of a telescope and a large-diameter lens. The fast galvanometer mirrors can sometimes move the spots in less than 100 microseconds, which corresponds well with the desired laser pulse frequency of 10,000 laser shots per second. The cited patent specification DE 10 2011 112 649 B4 and all its content shall be included here by reference. The principle of temporally variable laser spot control is shown in FIG. 1.

The laser system described in patent specification DE 10 2011 112 649 B4 has a service life of several billion laser shots. For continuous operation at full shot capacity, this corresponds to a service life of around 35 days; for eight hours of operation on five days a week, the service life is around 150 days. This service life still leaves room for improvement. There is a need for a laser system which has a longer service life, for example ten times that.

Investigations have shown that the service life is limited by a degradation of the multiplier crystals. The beam exit site of the tripling crystal suffers in particular, because here the UV beam decomposes unavoidable deposits of tiny particles or organic molecules on the surface and thus creates a site where the absorption continually increases. It is fundamentally not possible to completely remove the organic substances occurring only in minute trace concentrations. There even appear to be mechanisms which cause the tiny particles and organic molecules to migrate to the surface of the tripling crystal.

It is known that the service life of this tripling crystal can be increased by parallel shifting of the crystal so that the UV beam, which has a diameter of only a few hundred micrometers here, always exits the surface at fresh locations. This parallel shift fundamentally requires extremely high precision, since even the slightest tilt drastically reduces the nonlinear effect of the crystal. Such a shifting mechanism is complex and expensive; moreover, the electromechanical drive elements contribute to the contamination of the surrounding gas through wear and tear, for example.

The patent specification U.S. Pat. No. 7,460,569 B2 (Van Saarlos; 2008) describes how a parallel offset of a laser beam can be generated by a plane-parallel plate tilted in relation to the axis and rotated about the beam. The rotation causes the beam to execute a circular movement through the multiplier crystals, which increases the service life. A second rotatable, plane-parallel plate shifts the beam back into the original axis.

The patent specification U.S. Pat. No. 8,885,246 B2 (D. Horain et al., 2009) describes how an additional tilting movement of the plane-parallel plates can bring about not only a circular parallel movement of the laser beam, but also a scan which utilizes the entire surface of the crystals. It also describes how the second plate has to be tilted independently of the first in order to bring the beam back accurately into the original axis because the refractive index changes with the beam wavelength.

The arrangements described in both patent specifications again require electromechanical drives that operate very precisely, which can in turn contaminate the surrounding gas. There is therefore still a need for methods and devices to prolong the service life of the laser system for mass spectrometers with laser desorption ion sources, especially MALDI sources.

SUMMARY OF THE INVENTION

For a mass spectrometer with laser desorption ion source, a laser system with temporally variable optical laser spot control is proposed in which the laser spot shift, which is produced by means of an angular deflection in a mirror system (for example at two galvanometer mirrors), is performed not on the frequency-increased laser beam after it has left the multiplier crystal system, but on the laser beam before or during the multiplication of the energy. The beam, which is deflected through a small angle by the mirrors, is converted by a high-quality flat-field optical system into a parallel-shifted laser beam, which then passes through a multiplier crystal (for example a doubling crystal and a tripling crystal). After exiting the multiplier crystal system, the parallel-shifted beam is converted back into a slightly angled beam by a second flat-field optical system, and the beam then brings about the spot shift on the sample in the way which is already known. Uniform scanning of the sample therefore leads automatically to uniform scanning of the multiplier crystals. The parallel shift of the laser beam in front of or within the multiplier crystal system causes the exit site of the frequency-increased laser beam from the multiplier crystal to shift along with the spot control on the sample in the desired way, thus increasing the service life.

The invention therefore relates to a mass spectrometer (for example for imaging mass spectrometry) which has an ion source which ionizes samples on a sample support by means of laser desorption (for example via MALDI) and contains a laser system for this purpose and has a mass analyzer to detect the ions produced. The laser system comprises the following subsystems: a) a laser (for example IR laser) to generate laser beam pulses of long-wavelength light, b) a multiplier crystal system to generate laser beam pulses of short-wavelength light from the laser beam pulses of long-wavelength light, c) a mirror system for the position control of laser spots on the sample support by means of an angular deflection of laser beam pulses, d) a first flat-field optical system behind the mirror system to transform the angular deflection of the laser beam pulses into a parallel shift (for example parallel to an axis of the multiplier crystal system), and e) a second flat-field optical system behind the multiplier crystal system to transform the parallel shift back into an angular deflection of the laser beam pulses of short-wavelength light.

The mirror system preferably contains two movable mirrors to deflect the laser spots in both spatial directions at right angles to the surface of the sample support, for example one or two galvanometer mirrors. All elements which deflect light by means of reflection shall be fundamentally considered as a mirror in the context of this disclosure.

Different embodiments may additionally have a pattern generator to generate a laser spot pattern on the surface of the sample support.

The mass analyzer is preferably a time-of-flight analyzer with axial or orthogonal ion injection (TOF-MS), an ion-cyclotron-resonance analyzer (ICR-MS), a radio frequency voltage ion trap (IT-MS) or an electrostatic ion trap of the Kingdon type.

The first flat-field optical system can be positioned in front of the multiplier crystal system. In this case, all subsequent multiplier crystals benefit from the laser beam shift and the associated material conservation.

In different embodiments, the multiplier crystal system can have two (or more) multiplier crystals, for example one doubling crystal and one tripling crystal. The first multiplier crystal can produce visible, green coherent light from infrared coherent light, and the second multiplier crystal can produce ultraviolet coherent light from the visible, green coherent light and the infrared coherent light. In certain embodiments, the mirror system and the first flat-field optical system can be positioned between the multiplier crystals. The service life of a tripling crystal in particular can benefit from the continuous laser beam shifting because the degradation processes in the crystal are amplified, the higher the photon energy.

In different embodiments, a telescope can be provided to expand the angularly deflected laser beam pulses of short-wavelength light. Furthermore, an object lens can be provided to focus the expanded laser beam in laser spots on the sample support.

The invention also relates to a method for the operation of a mass spectrometer with laser desorption ion source, whose laser system generates laser beam pulses of long-wavelength light, from which a multiplier crystal system produces laser beam pulses of short-wavelength light, which are then guided to a sample support in order to generate ions there by means of laser desorption, said ions being detected in a mass analyzer, and a mirror system deflects the laser beam through an angle such that an area on the sample support is scanned or sampled. Downstream of the mirror system, the laser beam pulses pass through a first flat-field optical system, which converts the angular deflection into a parallel shift. Downstream of the multiplier crystal system, the laser beam pulses of short-wavelength light pass through a second flat-field optical system, which converts the parallel shift back into an angular deflection.

BRIEF DESCRIPTION OF THE ILLUSTRATIONS

FIG. 1 shows a greatly simplified schematic of a MALDI time-of-flight mass spectrometer whose arrangement corresponds to the Prior Art.

FIG. 2 again depicts a schematically greatly simplified example of a new arrangement in the region in front of the Keplerian telescope (9). The IR beam generated in the infrared laser (2), for example at 1064 nanometers, is deflected in both spatial directions by the two galvanometer mirrors (7) and (8) before it enters the multiplier crystals (5) and (6). A high precision flat-field optical system (3) transforms the angularly deflected IR beam into a beam which here runs extremely parallel to the axis of the multiplier crystals (5) and (6), but is shifted more or less parallel, depending on the angle. The UV beam exiting the tripling crystal (6), third harmonic generation—THG, for example at 355 nanometers, is then transformed back into an angularly deflected beam by a second flat-field optical system (4). Since, generally, the spot control scans the full movement range for the laser spot on the sample support (13), this arrangement fully exploits the volume of the multiplier crystals (5) and (6) and in particular the exit surface from the tripling crystal (6); this increases the service life of the laser system (1).

DETAILED DESCRIPTION OF THE INVENTION

Figure 1:
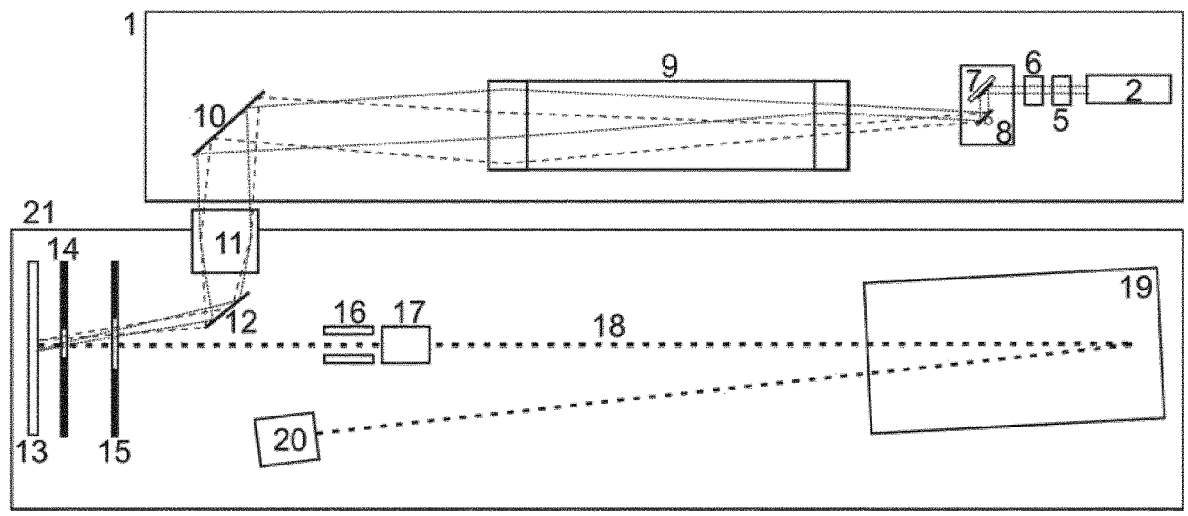

FIG. 1 shows a greatly simplified schematic of a MALDI time-of-flight mass spectrometer with a time-of-flight analyzer (21) and a laser system (1) which controls the laser spot position of the light pulse on the sample support plate (13) by means of a mirror system comprising two galvanometer mirrors (7, 8). The laser pulse is generated in the infrared laser (2), its energy is doubled in a doubling crystal (5), and at least partially converted into the UV in a tripling crystal (6). In the mirror system, the UV beam is deflected in both spatial directions by two galvanometer mirrors (7) and (8). The deflected laser beam is then expanded in a Keplerian telescope (9) and shifted parallel as a function of the angular deflection. The mirror (10) directs the exiting laser beam into the very center of the object lens (11), with reduced angular deflection. Depending on the angular deflection, the beam passes through the object lens (11) centrally, but at slightly different angles, thus shifting the position of the spot pattern on the sample support plate (13). The ions generated in the plasma clouds of the laser spot pattern are accelerated by voltages at the diaphragms (14) and (15) to form an ion beam (18), which passes through the two deflection condensers (16) and (17) to correct its trajectory, and is focused onto the detector (20) by the reflector (19). This arrangement corresponds to the Prior Art.

It should be noted here that the beam guidance within a Keplerian telescope (9) is more complex and FIG. 1 does not reproduce it in real terms for reasons of simplicity, although the illustration does correctly reproduce the external effect of the telescope (9) on the laser light beam. In addition, further optical elements, such as lenses to correct the IR beam from the laser (2), which diverges because of thermal lenses, and to generate a very narrow beam through the multiplier crystals (5, 6), are not shown. These necessary optical elements are known to the person skilled in the art without any further explanation, however.

For a mass spectrometer with laser desorption ion source, a laser system is now proposed, with which the steadily progressive damage to the exit surface of the multiplier system is reduced not by mechanical parallel shifting of one of the crystals at specified intervals of time to provide fresh exit sites for the incident laser beam, but by continuous optical parallel shifting of the laser light beam such that the whole exit surface of the crystal is used. This also reduces the time the laser dwells on the same spot on the crystal, which largely prevents accumulative degradation processes at one spot. No plane-parallel plates with electromechanical drives are used for rotation and tilting, however, but instead a mirror system, consisting of galvanometer mirrors, for example, whose deflection properties do not change as a function of the wavelength (and which is moreover comparatively low in mass and therefore low in inertia).

Figure 2:
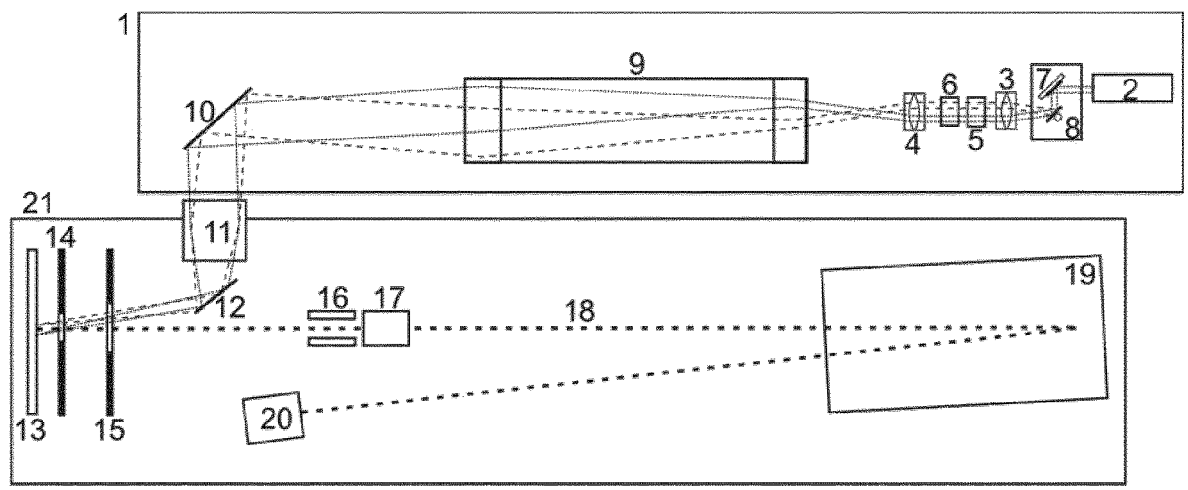

To this end, and as is shown in FIG. 2 by way of example, the shift of the laser spot here, which is produced by an angular deflection at two galvanometer mirrors (7) and (8), is not applied the UV beam after it has exited the tripling crystal (6), but to the infrared beam before the energy multiplication. The IR beam deflected at small angles by the galvanometer mirrors (7) and (8) is converted by a high-quality flat-field optical system (3) into an IR beam, which is shifted very accurately parallel to the axis of the multiplier crystals (5) and (6), and then passes through the two multiplier crystals (5) and (6), partially tripling its quantum energy in the process. After exiting the tripling crystal (6), a further flat-field optical system (4) converts the parallel-shifted beam back into an angled beam, which then brings about the spot shift on the sample in the way which is already known.

Figure 3:
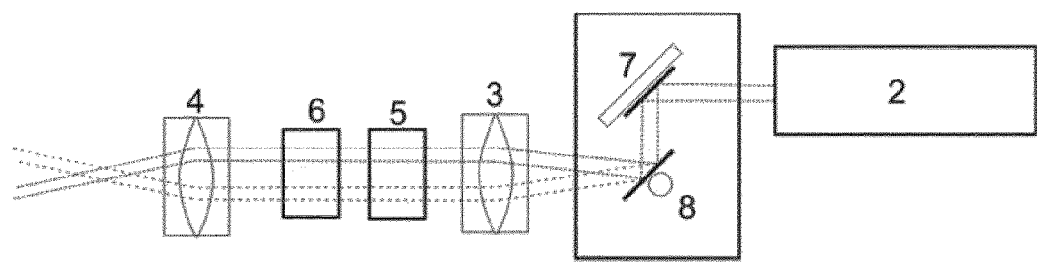
FIG. 3 is an enlargement of the new example arrangement from FIG. 2 in front of the Keplerian telescope (9).

FIG. 3 shows an enlarged illustration of the principle of the angular deflection of the IR beam from FIG. 2. It shall, however, be noted here that it is a simplified schematic to illustrate the basic idea of the invention. Many details are not shown here. It is, for example, necessary for the IR beam, which diverges because of a thermal lens in the exit mirror of the laser (2), to be made parallel again by means of a lens. The flat-field optical system (3) also serves to reduce the laser beam to a diameter of a few hundred micrometers in order to generate a sufficiently high photon density in the multiplier crystals. Finally, the UV beam can also pass through a device to generate the spot pattern and through a variable beam attenuator, which can regulate the intensity by several orders of magnitude, but these are also not shown here for reasons of clarity.

Since, for most applications, the laser spot control on the sample support (13) scans or samples the complete available surface of several hundred micrometers square, the laser spot control on the sample fully exploits the exit surface of the tripling crystal (6) by virtue of the parallel shift of the narrow infrared beam, with a diameter of several hundred micrometers, in the tripling crystal, which for example has a useful square cross-section with an edge length of around three millimeters. The contamination of the surface brought about by the decomposition of organic molecules is thus reduced by a factor of around ten to a hundred, extending the service life accordingly.

It should be noted here that an additional, quite simple procedure to extend the service life of a multiplier crystal can consist in enlarging the crystal and thus the area available for the beam to pass through. The larger the useful crystal volume, the shorter the time for which relevant partial volumes of the crystal are subjected to photons during the scanning or sampling.

Figure 4:
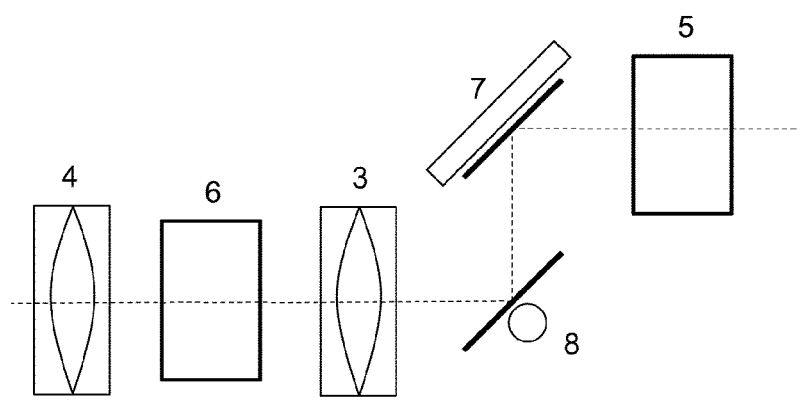
FIG. 4 depicts an alternative arrangement of the multiplier crystals (5, 6) relative to the mirror system (7, 8) and the near-field optical systems (3, 4).

A flat-field optical system is a lens system with particularly good correction. The flat-field optical systems (3) and (4) only need to be well corrected for the wavelengths used, however, because chromatic aberrations do not play any part. The flat-field optical system (3) therefore only has to be corrected for infrared in the example given, not for a UV beam. If the first flat-field optical system (3) is located between two multiplier crystals, for example between a doubling crystal (5) and a tripling crystal (6) as indicated in FIG. 4, the wavelength to be corrected can be in the green visible region (possibly in the infrared additionally), for example. In both cases, relatively low-cost types of glass can be used. For the embodiment shown, the second flat-field optical system (4) must, however, be made from UV-transmitting material, silica glass, for example, but likewise optically corrected for this wavelength only.

Lenses, which are normally required to adjust the diameters of the laser beam between the crystals (5) and (6), are omitted in FIG. 4 for reasons of clarity.

The fast scanning of the whole exit surface of the tripling crystal (6) according to the invention is far superior to the mechanical parallel shifting of the multiplier crystals or the use of plane-parallel plates to shift the beam. Mechanical shifting, rotation or tilting is so slow compared to the utilized pulse rate of the laser that an exit site is subjected to many laser shots in succession at a pulse rate of 10 kilohertz. The situation is different for the fast optical scanning proposed. The continuous scanning of the whole area means that each laser shot can impinge on a new site of the crystal exit surface, and each site has a certain time to regenerate until the whole area has been scanned completely and it is the turn of this site again and the beam passes through it again. For example, the complete scanning or sampling of a square sample area with 0.3-millimeter edge length with a pattern of nine laser spots, each with a diameter of five micrometers, requires more than 1,000 laser shots; each exit site thus has around 0.1 seconds for regeneration.

A further important advantage with certain embodiments is the use of galvanometer mirrors in the infrared wavelength range, for example at 1064 nanometers. The destruction limits here are considerably lower than those of the UV wavelength range—by up to a factor of 10. The laser beam at this location can therefore be made smaller than in the UV range. This makes it possible to increase the precision of the position shift on the sample by the galvanometer mirrors by around a factor of three. This means that the deflection system is more tolerant of external interferences such as temperature fluctuations.

Different types of mass spectrometer can be used for the invention. The analyte ions produced with the laser system can preferably be detected and analyzed in a special MALDI time-of-flight mass spectrometer with axial ion injection, as shown schematically in FIGS. 1 and 2. However, it is also possible to feed the analyte ions to other types of mass analyzer for analysis, such as time-of-flight mass spectrometers with orthogonal ion injection (OTOF-MS), ion cyclotron resonance mass spectrometers (ICR-MS), radio frequency ion trap mass spectrometers (IT-MS) or electrostatic ion trap mass spectrometers of the Kingdon type.

Multiplier crystal systems with two crystals are described in the examples shown. It shall, however, be understood that applications which operate with a single-step, or more than a two-step, frequency increase of the photon energy are also conceivable (one crystal, two crystals, three crystals, etc.). The examples must therefore not be seen as limiting.

Reference was made to MALDI in the explanations above. The principles shown here can, however, be realized with other laser desorption/ionization mechanisms without the sample molecules necessarily having to be embedded in a matrix. In this respect, the present disclosure must be understood in a correspondingly broad way.

Further embodiments of the invention are conceivable in addition to the embodiments described by way of example. With knowledge of this disclosure, those skilled in the art can easily design further advantageous embodiments of laser systems for mass spectrometers, which are to be covered by the scope of protection of the appended claims.

The invention claimed is:

1. A mass spectrometer comprising an ion source which ionizes samples on a sample support by means of laser desorption, and for this purpose comprises a laser system, and a mass analyzer to detect the ions produced, where the laser system comprises the following subsystems:
   a) a laser to generate laser beam pulses of long-wavelength light,
   b) a multiplier crystal system to generate laser beam pulses of short-wavelength light from the laser beam pulses of long-wavelength light, the multiplier crystal system comprising an output multiplier crystal from which the short-wavelength light pulses are output,
   c) a mirror system for the position control of laser spots on the sample support by means of an angular deflection of the long-wavelength laser beam pulses,
   d) a first lens system positioned between the mirror system and the output multiplier crystal for transforming the angular deflection of the laser beam pulses into a parallel shift, and
   e) a second lens system positioned between the output multiplier crystal and the sample support for transforming the parallel shift back into an angular deflection of the laser beam pulses of short-wavelength light.

2. The mass spectrometer according to claim 1, wherein the mirror system contains two movable mirrors to deflect the laser spots in both spatial directions at right angles to a surface of the sample support.

3. The mass spectrometer according to claim 2, wherein the mirror system contains one or two galvanometer mirrors.

4. The mass spectrometer according to claim 1, further comprising a pattern generator to generate a laser spot pattern on a surface of the sample support.

5. The mass spectrometer according to claim 1, wherein the mass analyzer is one of a time-of-flight analyzer with axial or orthogonal ion injection (TOF-MS), an ion-cyclotron-resonance analyzer (ICR-MS), a radio-frequency voltage ion trap (IT-MS) and an electrostatic ion trap of the Kingdon type.

6. The mass spectrometer according to claim 1, wherein the multiplier crystal system has two multiplier crystals.

7. The mass spectrometer according to claim 6, wherein the first lens system is positioned between the mirror system and the multiplier crystal system.

8. The mass spectrometer according to claim 6, wherein a first multiplier crystal produces visible green coherent light from infrared coherent light, and wherein the output multiplier crystal is a second multiplier crystal that produces ultraviolet coherent light from the visible, green coherent light and the infrared coherent light.

9. The mass spectrometer according to claim 6, wherein the mirror system and the first lens system are positioned between the multiplier crystals.

10. The mass spectrometer according to claim 1, wherein the laser produces infrared laser light pulses.

11. The mass spectrometer according to claim 1, wherein the ion source operates according to the MALDI principle.

12. The mass spectrometer according to claim 1, further comprising a telescope to expand the angularly deflected laser beam pulses of short-wavelength light.

13. The mass spectrometer according to claim 12, further comprising an object lens to focus the expanded laser light in laser spots on the sample support.

14. The mass spectrometer according to claim 1, wherein the parallel shift is executed parallel to an axis of the multiplier crystal system.

15. A method for the operation of a mass spectrometer with laser desorption ion source, whose laser system includes a laser that generates laser beam pulses of long-wavelength light, which a multiplier crystal system having an output multiplier crystal then transforms into laser beam pulses of short-wavelength light, which are then guided to a sample support in order to generate ions there by means of laser desorption, said ions being detected in a mass analyzer, and a mirror system deflects the laser beam pulses at an angle such that an area on the sample support is scanned or sampled, the method comprising:
- passing the laser beam pulses of long wavelength light through a first lens system positioned between the mirror system and the output multiplier crystal, which transforms the angular deflection into a parallel shift; and
- passing the laser beam pulses of short-wavelength light through a second lens system positioned between the output multiplier crystal and the sample support, which transforms the parallel shift back into an angular deflection.

* * * * *